United States Patent [19]

Bates et al.

[11] 4,109,012

[45] Aug. 22, 1978

[54] PREPARATION OF FRENCH FRIES

[75] Inventors: Paul Edward Bates, Woodlawn; John Ronald Hughes, Colerain Township, Hamilton County; Nahid Zoueshtiagh, Cincinnati, all of Ohio

[73] Assignee: The Procter & Gamble Company, Cincinnati, Ohio

[21] Appl. No.: 659,437

[22] Filed: Feb. 19, 1976

Related U.S. Application Data

[63] Continuation of Ser. No. 578,970, May 19, 1975, abandoned, which is a continuation of Ser. No. 428,513, Dec. 26, 1973, abandoned.

[51] Int. Cl.² ............................................... A23L 1/00
[52] U.S. Cl. ................................... 426/302; 426/438; 426/550; 426/637
[58] Field of Search ............... 426/637, 302, 550, 560, 426/438, 808

[56] References Cited

U.S. PATENT DOCUMENTS

| 2,160,902 | 6/1939 | Raymond | 426/550 |
| 3,597,227 | 8/1971 | Murray et al. | 426/302 |
| 3,622,355 | 11/1971 | Beck | 426/637 |
| 3,812,274 | 5/1974 | Weaver et al. | 426/438 |

FOREIGN PATENT DOCUMENTS 866,172  4/1961  United Kingdom.

OTHER PUBLICATIONS

Ida Bailey Allen's Modern Cook Book, Garden City Publishing Co. Inc., Garden City, N.Y. 1935, p. 483.

*Primary Examiner*—Raymond N. Jones
*Assistant Examiner*—C. A. Fan
*Attorney, Agent, or Firm*—Leonard Williamson

[57] ABSTRACT

A process for preparing an edible potato dough suitable for preparing French fried potatoes which closely resemble French fried potatoes prepared directly from fresh, raw potatoes, in which the unpeeled potatoes are first baked, then peeled, riced and formed into a potato dough.

12 Claims, No Drawings

PREPARATION OF FRENCH FRIES

CROSS-REFERENCE TO RELATED APPLICATION

This is a continuation of application Ser. No. 578,970, filed May 19, 1975 which is a continuation of application Ser. No. 428,513, filed Dec. 26, 1973, both abandoned.

BACKGROUND OF THE INVENTION

The present invention relates generally to edible potato products produced from a workable potato dough. More particularly, it relates to improved French fried potatoes formed from a potato dough.

Originally, French fried potatoes were made by peeling raw potatoes, cutting them into strips and then frying the strips in oil. However, French fries produced in this conventional manner from raw potatoes are disadvantageous in several respects.

First, the quality of French fries will vary with the potato used. This variance will occur both between different species of potatoes and the age of the potato within a given species. The variance is due to different chemical characteristics inherent in the potatoes, such as sugar content, starch content and specific gravity. The problems caused by variations of such properties in potatoes are discussed in detail in *Potato Processing* published in 1959 by the A.V.I. Publishing Company, Inc. West Port, Conn., and edited by W. F. Talbert and O. Smith.

Second, there is a substantial amount of waste in the raw starting material attributable to variations in size and the irregularities in shape of the starting vegetable. It is necessary to use essentially only the central portion of the potato in order to make strips of suitable size. Accordingly, smaller pieces in the form of slivers and the like are discarded or converted into less desirable food products.

Third, the cut potato strips, from which French fried potatoes are made, necessarily vary in size because of the irregular shape of potatoes; therefore a batch of cut strips does not fry uniformly.

Finally, it is necessary to peel and cut the potatoes at the time that the French fried potatoes are to be prepared to get a final food product with a desirable flavor, texture, and consistency. This is very time consuming and a great delay during the food services rush periods where French fried potatoes are prepared in quantity. In addition, there is the well-known disadvantage of the loss spoilage of fresh potatoes during storage.

To solve the inadequacies of French fried potatoes produced from raw potatoes, attempts have been made to produce "fabricated" French fries from a potato dough, such as the processes disclosed in Backinger et al., U.S. Pat. No. 3,085,020, issued Apr. 9, 1963; Fritzberg, U.S. Pat. No. 3,282,704, issued Nov. 1, 1966; Willard et al., U.S. Pat. No. 3,399,062, issued Aug. 27, 1968; or, Keller, U.S. Pat. No. 3,468,673, issued Sept. 23, 1969. In this manner the composition of the French fry can be more or less controlled. The raw material can be made just prior to frying or the fabricated French fry pieces can be frozen to eliminate any quality variation induced by time. Moreover, the size of the pieces can be carefully controlled to assure uniformity of frying.

Although alatable fabricated French fries have been produced by prior techniques, the quality attained has never equalled the quality of a high quality French fry produced in the conventional manner from raw potatoes. Two problems have been encountered; namely the flavor of a high quality of natural French fry has never been duplicated, and, secondly, the same internal texture surrounded by a crisp yet tender outer surface, or "crust", has never been achieved. This desirable internal texture has been described in Vahling, U.S. Pat. No. 3,175,914 as being mealy and having the consistency of a baked potato. However, no one has yet attempted to utilize a baked potato starting material in the formation of a French fry potato product. This may be due to any number of reasons; for example, the desirable mealy internal texture of a baked potato may possibly have been thought to be lost in the course of subsequent processing steps necessary to fabricate the final French fry product. But it has been surprisingly discovered that the mealy internal texture of baked potatoes is retained during further processing steps to give an ideal French fried potato product with the same desirable internal consistency, flavor and crisp yet tender exterior crust characteristic of high-quality French fries made from raw potatoes.

BRIEF DESCRIPTION OF THE INVENTION

Briefly, in accordance with the invention, the novel process for the preparation of a workable potato dough adapted to the formation of French fried potato pieces involves baking potatoes which have been previously washed, then processing these baked potatoes into a workable dough for subsequent formation into French fry potato pieces.

DETAILED DESCRIPTION OF THE INVENTION

As has been stated, the production of French fries from a potato dough is known in the art. However, the process of the present invention offers a significant improvement in the texture and flavor of these formed French fries.

In accordance with the present invention raw, unpeeled white potatoes are obtained for baking. Any variety of potatoes is acceptable, for instance Garnet Chili, Early Rose, Russet Rural, Peach Blow, Early Ohio, Triumph, Kennebec, Merrimack, Delus, Saco, Katahdin, Bounty, Cherokee, Chippewa, Early Gem, Haig, Irish Cobbler, La Rouge, Norgold Russet, Norland, Onaway, Pungo, Red LaSoda, Red McClure, Red Pontiac, Russet Burbank, Russet Sebago, Sebago, Superior, Viking, or White Rose are all acceptable varieties. However, it is preferred to use Russet Burbank or Katahdin potatoes in the practice of this invention to obtain the best combination of internal texture and flavor in the final French fry potato product.

The potatoes are then washed to remove dirt and surface irregularities. This scrubbing operation is not essential; however, it is desirable since it removes soil and other foreign materials and prevents them from becoming intermixed with the potato material at later steps in the process.

The whole potatoes are then cooked by baking until they are completely cooked. For the purposes of this invention, "baking" is hereby defined as dry or low humidity cooking without the use of added moisture or the use of any external means which would cause retention of the natural internal moisture of the potatoes, as would a boiling or steaming operation. Also, for purposes of this invention, "complete" cooking is hereby defined as that stage in cooking when the internal temperature of the center of the potato has reached a temperature of at least about 190° F. This temperature may be measured by use of a "meat thermometer" inserted into the potato or by any other convenient means, many of which are well known in the art.

Although the above definition of "complete cooking" gives a method of definitely ascertaining when the potato is completely cooked, there are many other ways well known in the art to measure the "completeness" of cooking other than by a direct measurement of the internal temperature. For example, a completely baked potato is characterized by a soft, uniform, mealy internal texture as compared to the firm, hard internal texture of a raw potato. If the potato is pierced with a sharp instrument, such as a fork, the degree of change in the firmness of the body of the potato may be measured.

Another convenient means of measurement of complete baking is based on the fact that potatoes have a uniform rate of baking. Thus, baking potatoes at a given temperature for a length of time which has previously been determined to produce fully baked potatoes will give good results. These baking times and temperatures are well known in the art and are readily available to any novice by reference to a basic cookbook. For example, at page 414 of *Betty Crocker's New Picture Cookbook,* the stated baking parameters are either at 375° F for 1 hour or at 350° F for 1½ hours. Of course, the above-stated times and temperatures are merely suggestive of the inter-relationship between time of baking and the temperature needed to insure complete baking. One skilled in the art will appreciate that the suitable range of baking times varies widely depending upon the baking temperature; or, simply stated, the higher the baking temperature, the shorter the time required for complete baking. This method of measuring the completeness of baking is preferred for use in connection with the present invention due to the ease and simplicity in measurement and control of a number of potatoes baked at a time.

The potatoes may be baked by any convenient means. Possible methods of baking include using forced air convective ovens, free air convective ovens, microwave ovens, infrared ovens, or by use of the apparatus disclosed in U.S. Pat. No. 3,455,232. The preferred method of baking is by use of a forced air convective oven which allows all surfaces of the potato to be treated at one temperature which promotes uniformity in baking.

In the practice of the present invention, it is preferred that the potatoes be baked with their skin intact. An acceptable baked potato will be produced if the pototoes are first peeled; however, a better and more preferred baked potato is obtained by leaving the skin intact during baking. By leaving the skin intact, the rate of moisture loss from the potato is slowed since the skin serves as a natural barrier to moisture loss from the potato. However, during the baking operation, sufficient moisture escapes to give the potato, and ultimately, the final French fried potato product, the desirable mealy internal texture. Also, there are many flavor chemicals in and immediately beneath the potato skin. If the skin is retained during baking, these flavors are imparted to the potato to give the potato, and ultimately the French fried potato product, a more desirable, fullbodied potato flavor. Conversely, if the skin is removed, not only are these flavor chemicals lost, but other flavors from the internal body can be lost, being carried off with the escaping internal moisture. In addition, if the natural skin is removed prior to baking, a hard crust, or "secondary skin" forms on the potato during baking. This must subsequently be removed before the remainder of the potato is suitable for final dough formation causing a significant yield loss.

The process of the present invention can also be employed with excellent results with the use of potatoes which are subjected to a multiple-stage cooking, i.e., a pre-cooking step and then baked until fully cooked. This pre-cooking step may be either a boiling or steaming operation with the only limitation being that any pre-cook operation should not cause a rupture of a significant amount of the potato cells which would destroy the dry, mealy consistency of the potato after baking.

After the potatoes are completely baked, they are peeled, or the hard external crust is removed. This is accomplished by any convenient means known in the art. However, it should be noted that the standard methods of abrasion or lye peeling commonly used on raw potatoes are unacceptable for the practice of the present invention. This is due to the fact that both of the above peeling methods are dependent on a hard, firm potato body with a comparatively soft skin. This situation is reversed with a baked potato, which is characterized by a soft internal consistency with a relatively hard external skin. Baked potatoes are conveniently peeled by cutting the potatoes in half and scraping out the internal portion with any convenient instrument, for instance, a fork or a spoon. Baked potatoes can also be peeled by cutting them in half and placing the halves on a screen grating and applying pressure on the skins from the top, thus causing the internal portion to fall through the grating to be collected below. If this latter method is used, it is preferred that in the practice of the present invention a grating with a screen opening of no smaller than 35 mesh be used. If a smaller grate opening is used, a significantly increased amount of cell disruption occurs and tends to reduce the desirable mealy internal texture of the final French fried potato product.

After the potatoes are peeled, the potato material may be comminuted to remove any large lumps appearing therein. Of course this step may be omitted if the potatoes are peeled by use of a screen grating which effectively peels and comminutes the potatoes in one step. The means used for comminuting may be any convenient means which effectively reduces the particle size so that a coherent workable dough may be formed from the baked potato material. However, it is preferred that the means used for comminuting impart a minimum amount of work to the baked potatoes. This is to keep the degree of individual potato cell rupture to a minimum.

The potato material is then formed into French fry potato shapes. This can be accomplished either with or without the addition of other non-potato ingredients. If the baked potatoes have been comminuted using a screen grate opening of not greater than about 16 mesh, French fry potato-shaped pieces can be formed, and the final French fry product will have a desirable mealy texture, without the addition of any non-potato ingredients. Of course, the potato material must be comminuted to a degree sufficient to remove large lumps of potato which would otherwise interfere with the formation of the proper French fry potato shape, preferably through a grating with an opening of at least 2 mesh. The addition of optional non-potato ingredients is, of course, not excluded when a grate opening of not more than 16 mesh is used, but is not necessary for the formation of a coherent, workable dough. These optional ingredients may be desirable to give the final product certain desired characteristics; the only limitation placed on the use of any non-potato ingredients in the dough is that the added ingredients should not destroy the desirably mealy internal consistency and the superior flavor that is obtained by baking the potatoes.

However, if the baked potato is comminuted through a grating with an opening greater than about 16 mesh, additional non-potato ingredients should be added to retain the mealy texture similar to that of French fried potatoes produced directly from raw potatoes. The necessity of adding additional ingredients is theorized to be due to the increased amount of potato cell breakage when a smaller mesh grating is used. This results in an increase in the amount of free starch in the potato material tending to give the final French fried potato product a gummy internal consistency. To overcome this gumminess, various additional ingredients may be added. For example, a wide range of emulsifiers known to those skilled in the art are suitable for addition to the riced potato material. Many of these emulsifiers are available commercially, such as Tween 60 KP, composed of polysorbate; Span, composed of sorbitan monostearate; or Myverol, composed of glycerol monstearate. Other suitable commercial products include Monomyristini and Duex. Of course, this listing is not intended to be exhaustive, as a great variety of emulsifiers are suitable as starch control agents for use with the baked potato material. In the practice of the present invention, a commercial emulsifier, Duex, has been found to give excellent results when added to a dough made from finely riced potato material. Duex is purported to be composed of 35% monoglycerides with the balance being a mixture of di- and tri-glycerides and glycerine.

Animal or vegetable fats may be added to give the final French fry a crisper external surface, a darker color upon subsequent frying, and a different mouth feel when the French fries are eaten. Alkylcellulose ethers, such as those produced under the name of Methocel MC, or alkyl hydroxyalkylcellulose ethers, such as those produced under the name of Methocel HG, ranging in viscosities from 100 to 15,000 CPS, may be added to to vary the final product internal texture or to decrease fat absorption when the French fried potato pieces are deep-fat fried. Also, commercially available preservatives, such as sodium acid pyrophosphate, BHA, BHT, sodium EDTA, or sodium bisulfate may be added to reduce enzymatic oxidation of the final product before it is fat-fried; and, flavoring agents, such as monosodium glutamate, salt, butter, onion, or garlic may be added to enhance the natural potato flavor or modify the flavor to any desired taste.

One skilled in the art will readily appreciate that the above listing of potential non-potato ingredients is in no way exhaustive, but is merely suggestive of the wide range of food additives which are suitable for use in the practice of the present invention.

After any desired ingredients are added to the baked potato material, a workable dough is formed by an admixture of the potato material with these added non-potato ingredients. It is preferred that the mixing operation be performed with a minimum amount of work to the dough to avoid a large amount of breakup of individual potato cells and a corresponding increase in the free starch level.

When the dough is formed, either from the admixture of the baked potato material and other non-potato ingredients, or from the baked potato material alone, if it has not been comminuted through a grating of less than about 16 mesh, the French fry potato shaped pieces are formed. This may be accomplished by any of several methods, such as extrusion, molding, casting, sheeting, or by any other means to achieve a three-dimensional shape known to the art. If an extrusion process is employed, a ram-type extruder is best employed so that a minimum amount of mechanical shear and stress is imparted to the baked potato dough. Another alternative method contempled in the practice of the present invention is to form the potato dough into a sheet and cut the French fry potato shaped strips therefrom. The potato dough sheet may be formed from the dough in any convenient manner, with the thickness of the sheet determined by the desired thickness of the French fry potato pieces. After the dough sheet is formed, the individual French fry potato pieces are formed by cutting the dough into strips by any convenient means. Again, the desired size of the final French fried potato product determines the width of the cut strips.

French fried potatoes made from raw potatoes have a slightly crisp outer surface surrounding the mealy internal portion. In order to at least duplicate this crisp outer surface with formed French fries, it is necessary to condition the surface of the cut dough strips to promote the formation of a crisp outer surface, or "crust", which aids in achieving product coherency while maintaining the desirable mealy internal consistency. This surface conditioning may be performed by any method which accomplishes the above results. For instance, the baked potato dough strips may be directly par-fried, that is, deep-fat fried to form a crust; for example, par-frying at between about 300°–400° F for about 10 seconds to about 3 minutes forms desirable French fry potato pieces with a crisp external crust and with a soft, mealy internal consistency. The preferred method of conditioning to promote skin formation, however, is the use of an air heat treatment. Any convenient means may be used to effect the skin formation, such as a forced air convective oven, a free air convective oven, a microwave oven, or an infrared oven. This surface conditioning can be carried out at between about 250°–500° F to achieve the desired skin formation. Of course, the length of time to which the French fry potato pieces is subjected to the air heat treatment varies with the temperature employed. In the practice of the present invention, heating the French fry potato pieces in a forced air convective oven at 350° F. for about 10 minutes or at 450° F for about 3 minutes is preferred in that it gives a very desirable French fry potato piece with a crisp external crust surrounding a soft, mealy white interior.

In the crust formation step, a very good French fry potato piece also results by first coating the baked potato dough strip with either a starch solution, such as an amylose solution or any amylopectin solution, or with a film forming agent, such as Methocel or Ediflex and then processing the baked potato dough strip with either an air heat or oil heat treatment step.

The French fry potato pieces can then be immediately consumed or packaged and stored in an appropriate manner. If the French fry potatoes are to be immediately consumed, the pieces may be finish deep-fat fried to achieve the desirable golden brown color characteristic of French fries made from raw potatoes. Alternately, the French fry pieces may be frozen for convenient storage and shipment for later use. When the French fry pieces are desired to be consumed, the frozen pieces are deep-fat fried or otherwise heated until the desired product characteristics are achieved.

In an alternative embodiment of the present invention, the riced baked potato material may be dehydrated and subsequently rehydrated before the coherent workable dough is formed thereby. This additional step may be advantageously used to assure a ready supply of the baked potato starting material.

After the baked potato has been peeled and riced, the baked potato material may be dehydrated by any convenient means known in the art. The resultant dehydrated baked potato material has the advantages of a longer storage life and storage under more economic or convenient conditions than does the non-hydrated baked potato material. This allows greater assurances of maintaining a constant and adequate availability of the baked potato material for subsequent dough formation. It has been found that dehydrating and subsequently rehydrating the baked potato material after storage yields final French fry potato products which exhibit the same internal soft, mealy consistency and flavor of French fries made from raw potatoes.

The formation of French fry potato pieces using dehydrated baked potatoes does not vary significantly from that outlined above in connection with non-dehydrated baked potatoes. Of course, when dehydrated baked potatoes are used as the potato starting material, water sufficient to rehydrate the potato material must be added. This is conveniently added together with any desired non-potato ingredients and admixed to form a workable, coherent dough suitable for the further processing steps outlined above.

While applicant does not wish to be bound by any particular theory in the practice of the present invention, it is theorized that the desirable mealy internal consistency in baked potatoes is due to the fact that the vast majority of potato cells remain intact during baking, while a boiling or steaming method of cooking causes considerable breakage of the potato cells with a consequent liberation of the potato starch which then imparts the gummy consistency to the potato material.

The following examples are for the purposes of illustrating the present invention, and are not to be interpreted as in any way limiting the same:

EXAMPLE I

Twenty medium-sized Russet Burbank raw whole potatoes were washed to remove surface dirt and irregularities. The surfaces were dried by exposure to air. These potatoes were then baked in a 350° F forced air convective oven for 90 minutes. After removal from the oven, the baked potatoes were partially air cooled so as to avoid discomfort during skin contact in later manual handling steps. The baked potatoes were peeled and the internal part riced through a screen with a 12 mesh opening. A workable coherent dough was formed from the riced baked potato material and the dough was then cut into French fry-shaped pieces. These French fry pieces were baked in a forced air convective oven for 3.5 minutes at 475° F. After removal from the oven, the French fry pieces were air-cooled for 5 minutes and were then forzen at −40° F. and stored in a −10° to 0° F. freezer. Subsequently, the frozen French fry pieces were placed in a 350° F. commercial frying oil for 2 minutes. This produced French fried potatoes with an excellent flavor and a soft, mealy internal consistency similar to French fries made directly from raw potatoes.

EXAMPLE II

Baked riced, potato material was prepared in the same manner as stated in Example I. Thereafter, 0.5%, based on the potato material weight, of melted Duex (the brand name for a commercial emulsifier containing 35% monoglycerides and 65% of a mixture of di- and triglycerides and glycerine), and 0.5% based on the potato material weight of dry Methocel 1500 CPS (the brand name for a commercial methyl cellulose), were added to the riced baked potato material. This material was gently admixed for 2 minutes using a Hobart mixer operating at its slowest speed. The workable coherent potato dough thus produced was rolled into a sheet and French fry shapes cut therefrom. These French fry pieces are then frozen and stored in the same manner as described in Example I. When these frozen segments are deep-fat fried for 2 minutes at 350° F., excellent French fries having the soft, mealy internal consistency and flavor surrounded by a crisp outer crust characteristic of French fries made from raw potatoes are produced.

EXAMPLE III

Baked potato starting material is formed into French fry shapes in a manner identical to that described in Example I. These French fry pieces are then coated with an amylose solution and subsequently baked in a forced air convective oven for 3.5 minutes at 475° F. These French fry pieces were then frozen in the manner described in Example I. Upon later deep-fat frying, these French fries had the same crisp outer crust surrounding a soft, mealy internal consistency of French fries made from raw potatoes.

EXAMPLE IV

Baked, riced potato material was prepared in the same manner as described in Example I. This baked potato material was then drum-dried and flaked to a density of 0.25 gr./c.c. Subsequently, the following ingredients were added to one lb. of the baked, dehydrated flakes; 2 lbs. of tap water, temperature of 70°–80° F; 4.5 gr. of melted Primex, brand name for a commercial fat; 7.5 gr. of melted Duex, previously described in Example I; and 50 gr. of a 2% Methocel 1500 CPS solution. This combination was gently admixed for 2 minutes using a Hobart mixer operating at its slowest speed. The dough thus formed was rolled into a sheet and French fry-shaped pieces cut therefrom. These French fry pieces were then baked at 475° F. for 3 minutes in a forced air convective oven. Upon removal from the oven, the French fry pieces were air cooled for 5 minutes and then frozen at −40° F. After sustained storage at −10° F., the forzen French fry segments were deep-fat fried in a 350° F. commercial frying oil for 1½ to 2 minutes to yield excellent French fries having a crisp outer crust surrounding a soft, mealy interior texture and flavor very similar to French fries made from fresh potatoes.

While this invention has been described and exemplified in terms of its preferred embodiments, those skilled in the art will appreciate that modifications can be made without departing from the spirit and scope of the invention. Accordingly, applicants limit the scope of their invention only by the appended claims.

What is claimed is:

1. A process for the preparation of a mealy textured workable coherent potato dough adapted to the formation of french fry potato pieces which comprises:
   (a) baking whole unpeeled potatoes until they are completely cooked;
   (b) peeling said baked potatoes;
   (c) comminuting said peeled baked potatoes using a minimum amount of work to obtain and maintain a mealy textured comminuted baked potato material; and
   (d) forming a mealy textured coherent workable dough from said mealy textured baked potato material using a minimum amount of work on said baked potato material to avoid a large amount of breakup of individual potato cells and a corresponding increase in free starch.

2. The process of claim 1 wherein said mealy textured baked potato material is dehydrated and rehydrated subsequent to comminuting but prior to the formation of said dough.

3. A process for the preparation of french fry potato pieces which upon frying maintain a mealy internal texture which process comprises:
   (a) baking whole unpeeled potatoes until they are completely cooked;
   (b) peeling said baked potatoes;
   (c) comminuting said peeled baked potatoes using a minimum amount of work to obtain and maintain a mealy textured comminuted baked potato material; and
   (d) forming a mealy textured coherent workable dough from said baked potato material using a minimum amount of work to avoid a large amount of breakup of individual potato cells and a corresponding increase in free starch;
   (e) sheeting said mealy textured coherent workable potato dough;
   (f) cutting French fry shape potato pieces from said mealy textured coherent workable dough sheet; and
   (g) conditioning the external surfaces of said French fry potato pieces by treating said pieces to form a skin to give them more physical integrity.

4. The process of claim 3 wherein said mealy textured baked potato material is dehydrated and rehydrated subsequent to comminuting but prior to the formation of said dough.

5. The process of claim 3 wherein the external surface of the potato pieces is conditioned by heating said potato pieces in a convective oven.

6. The process of claim 3 wherein the external surface of said French fry potato pieces is conditioned by par-frying said potato pieces by deep-fat frying at between about 300°-400° F. for about 10 seconds to about 3 minutes.

7. The process of claim 3 wherein the external surface of said French fry potato pieces is conditioned by coating said potato pieces with a starch solution, and thereafter heating them.

8. The process of claim 3 wherein subsequent to conditioning the external surface of the potato pieces, said pieces are frozen.

9. The process of claim 1 wherein subsequent to the formation of the coherent workable dough, said dough is extruded and thereafter cut to form French fry potato pieces.

10. In the process of preparing a workable coherent potato dough suitable for the formation of french fry potato pieces, said process comprising the steps of cooking raw potatoes, processing said cooked potatoes to obtain a starting potato material, and forming a coherent workable dough from said starting potato material, the improvement which comprises:
    (a) baking whole, unpeeled potatoes until they are completely cooked;
    (b) peeling said baked potatoes;
    (c) comminuting said peeled baked potatoes to obtain a mealy textured baked potato material using a minimum amount of work;
    (d) forming a mealy textured coherent workable dough from said baked potato material using a minimum amount of work to avoid a large amount of breakup of individual potato cells and a corresponding increase in free starch.

11. The process of claim 1 wherein said baked unpeeled potatoes are peeled by cutting them in half and pressing the halves on a screen grating and applying pressure on the halves from the top, causing the internal portion to fall through the grating.

12. The process of claim 10 wherein said baked unpeeled potatoes are peeled by cutting them in half and pressing the halves on a screen grating and applying pressure on the halves from the top, causing the internal portion to fall through the grating.

* * * * *